(12) United States Patent
Weisbrod et al.

(10) Patent No.: US 6,289,877 B1
(45) Date of Patent: Sep. 18, 2001

(54) METHOD AND SYSTEM FOR CONTROLLING AN AIR-TO-FUEL RATIO IN A NON-STOICHIOMETRIC POWER GOVERNED GASEOUS-FUELED STATIONARY INTERNAL COMBUSTION ENGINE

(75) Inventors: Joseph C. Weisbrod, Stevens Point; Eric J. Weisbrod, Madison, both of WI (US); Curtis T. Pedersen, Fenton, MI (US)

(73) Assignee: ANR Pipeline Co., Detroit, MI (US)

( * ) Notice: Subject to any disclaimer, the term of this patent is extended or adjusted under 35 U.S.C. 154(b) by 0 days.

(21) Appl. No.: 09/662,245

(22) Filed: Sep. 14, 2000

Related U.S. Application Data

(63) Continuation of application No. 09/301,392, filed on Apr. 28, 1999.
(60) Provisional application No. 60/083,411, filed on Apr. 29, 1998.

(51) Int. Cl.[7] ................................................. F02D 41/14
(52) U.S. Cl. .................. 123/480; 123/352; 123/687; 123/696; 701/102; 701/110
(58) Field of Search .................................... 123/350, 352, 123/478, 480, 672, 27 GE, 687, 696; 701/102, 110, 103

(56) References Cited

U.S. PATENT DOCUMENTS

| | | |
|---|---|---|
| 615,393 | 12/1898 | Klein . |
| 2,628,606 | 2/1953 | Draper et al. . |
| 3,128,750 | 4/1964 | Schmidt . |
| 3,599,426 | 8/1971 | Oberdorfer, Jr. ................... 60/29 |
| 3,789,816 | 2/1974 | Taplin et al. ................. 123/119 R |
| 3,924,598 | * 12/1975 | Davis ................................ 123/306 |
| 4,047,507 | 9/1977 | Noguchi et al. ................ 123/32 EA |
| 4,098,248 | 7/1978 | Todd ..................................... 123/120 |
| 4,232,643 | 11/1980 | Leshner et al. ....................... 123/440 |
| 4,364,364 | 12/1982 | Subramaniam ....................... 123/527 |
| 4,368,707 | 1/1983 | Leshner et al. ....................... 123/436 |
| 4,383,441 | 5/1983 | Willis et al. ......................... 73/117.3 |
| 4,393,696 | 7/1983 | Willis et al. ......................... 73/117.3 |
| 4,393,843 | 7/1983 | Otsuka et al. ....................... 123/440 |
| 4,475,506 | 10/1984 | Riordan .............................. 123/352 |
| 4,503,824 | 3/1985 | Ninomiya et al. .................. 123/436 |
| 4,505,249 | 3/1985 | Young ................................ 123/527 |
| 4,550,701 | 11/1985 | Suzuki et al. ...................... 123/436 |
| 4,597,364 | 7/1986 | Young ............................ 123/27 GE |
| 4,617,892 | 10/1986 | Staerzl .............................. 123/352 |

(List continued on next page.)

Primary Examiner—Henry C. Yuen
Assistant Examiner—Hieu T. Vo
(74) Attorney, Agent, or Firm—Dykema Gossett PLLC

(57) ABSTRACT

A gaseous-fueled reciprocating internal combustion engine includes a carburetor having a throttle valve that is controlled by a speed governor. A proportional fuel control valve is disposed intermediate a fuel supply and the carburetor, and is controlled by an air fuel computing device. The computing device generates a control signal to adjust the fuel control valve based on a governor sensed variable indicative of engine speed, sensed engine torque, a governor output signal from the governor indicative of an opening position of the throttle valve wherein 100% corresponds to a wide open throttle position, and 0% corresponds to a closed position, and a lean combustion control map containing predetermined set point values stored in memory. During operation, the control valve is responsive to the control signal generated by the computing device for adjustment of a fuel flow therethrough so as to obtain a ratio of air to fuel provided to the engine that is substantially at a lean misfire limit of the engine, thereby reducing fuel consumption, $NO_x$ emissions, and reducing exhaust gas temperatures. Alternatively, the control signal is generated using engine speed alone.

27 Claims, 7 Drawing Sheets

U.S. PATENT DOCUMENTS

| | | | |
|---|---|---|---|
| 4,637,280 | 1/1987 | Oshiage | 74/866 |
| 4,686,951 | 8/1987 | Snyder | 123/527 |
| 4,991,555 | 2/1991 | Tamekio | 123/436 |
| 5,001,645 | 3/1991 | Williams et al. | 364/431.08 |
| 5,168,853 | 12/1992 | Kittelson et al. | 123/419 |
| 5,275,142 * | 1/1994 | Kapellen et al. | 123/436 |
| 5,353,765 | 10/1994 | Saikalis et al. | 123/438 |
| 5,381,771 | 1/1995 | Leshner | 123/436 |
| 5,413,075 | 5/1995 | Mamiya et al. | 123/431 |
| 5,447,137 | 9/1995 | Asano et al. | 123/436 |
| 5,615,655 | 4/1997 | Shimizu | 123/419 |
| 5,657,732 | 8/1997 | Wolters et al. | 123/436 |
| 5,690,072 | 11/1997 | Meyer et al. | 123/436 |
| 5,703,777 | 12/1997 | Buchhop et al. | 364/431.062 |
| 5,713,339 * | 2/1998 | Kishida et al. | 123/676 |
| 5,735,246 | 4/1998 | Vincent et al. | 123/436 |
| 5,738,070 | 4/1998 | Donaldson et al. | 123/352 |

* cited by examiner

| SPEED ↓ / TORQUE → | | | | | |
|---|---|---|---|---|---|
| 0 | 80% | 85% | 90% | 95% | 100% | 104% TORQUE ς |
| 75% | 50% | 60% | 55% | 70% | 75% | 82% |
| 100% SPEED Ψ | 56% | 70% | 80% | 95% | 100% | 100% |

FIG.4 (40, 46)

| SPEED ↓ / TORQUE → | | | | | |
|---|---|---|---|---|---|
| 0 | 70 | 80 | 90 | 100 | 104 TORQUE |
| 75 | 17 | 17 | 15 | 14 | 13 |
| 100 SPEED | 17 | 17 | 15 | 14 | 13.5 |

FIG.5 (42, 44)

| AMT, °F | BIAS |
|---|---|
| -20 | .80 |
| 0 | .85 |
| 30 | .94 |
| 60 | 1.00 |
| 70 | 1.00 |
| 80 | 1.00 |

FIG.6 (60)

METHOD AND SYSTEM FOR CONTROLLING AN AIR-TO-FUEL RATIO IN A NON-STOICHIOMETRIC POWER GOVERNED GASEOUS-FUELED STATIONARY INTERNAL COMBUSTION ENGINE

RELATED APPLICATIONS

This application is a continuation of application Ser. No. 09/301,392 filed on Apr. 28, 1999.

This application claims the benefit of provisional U.S. Application Ser. No. 60/083,411 filed Apr. 29, 1998.

BACKGROUND OF THE INVENTION

1. Technical Field

This invention relates generally to a system and method of controlling an internal combustion engine, and, in particular, to a system and method for controlling an air-to-fuel ratio of a gaseous-fueled internal combustion engine to a lean misfire limit of the engine.

2. Discussion of the Background Art

Owners and operators of industrial stationary engines have been concerned with both the efficiency of operation (i.e., fuel consumption of such engines) as well as emissions generated thereby for many years. In particular, the owners and operators of industrial stationary engines are subject to federal and state environmental regulations with respect to combustion products of such engines, such as $NO_x$, $CO_2$, and other emissions. Accordingly, there has been investigation into systems and methods for controlling gaseous-fueled engines to reduce emissions of certain types of combustion products. For example, conventional approaches for reduction of, for example, $NO_x$ emissions, are obtained by stoichiometric air-fuel (A/F) ratio operation in combination with non-selective catalytic reduction technology (NSCR). However, this approach uses a relatively increased amount of fuel.

Another approach taken in the art directed to optimizing efficiency and emissions has been to operate such engines at air-fuel ratios lean of stoichiometric. However, these approaches have shortcomings in producing reliable and effective operation.

As background, it is a known characteristic of gaseous-fueled internal combustion engines that they can be operated at air-fuel ratios lean of stoichiometric. Operation at these "lean" air-fuel ratios may not produce the output power called for; however, on the other hand, such operations may occur at air-fuel ratios not lean enough to be at a lean misfire limit of the engine. Thus, gaseous-fueled engines lose power (sometimes referred to as a loss of reserve power capacity) when operated at "lean" air-fuel ratios, even at air-fuel ratios substantially lean of stoichiometric, before operating erratically.

One problem generally with reciprocating engines employing conventional controls involves so-called "pumping losses." Known approaches for adjusting the air and fuel delivery for gaseous-fueled engines have a shortcoming in that even when operated at full rated power output, a throttle valve in the air and fuel delivery apparatus (e.g., carburetor) is not fully open. A undesirable trait of operating at less than wide-open throttle (WOT) is increased "pumping losses" (i.e., horsepower wasted by ingesting air through a flow limiting device, such as a partly closed throttle valve). Ostensibly this failure to operate the engine at wide-open throttle (WOT) is to allow the engine to have reserve power capacity in the event of control system drift. Since control system drift could not reliably be accounted for in known engine controls, it was therefore necessary to operate with such a reserve capacity.

As a result of pumping losses, fuel consumption of the engine is increased, thereby also increasing $CO_2$ emissions. The increased amount of combusted fuel elevates combustion temperatures, thereby increasing oxides of nitrogen as a combustion product. In addition, combustion of the extra fuel elevates temperatures, which in turn increases thermal stress on various engine parts such as pistons, rings, valves, heads, exhaust manifolds, etc. This increases maintenance costs.

There are primarily two control strategies for the "lean" control of the air-fuel ratio of gaseous-fueled internal combustion engines: (i) open loop control (i.e., with no feedback information), and (ii) closed loop control (i.e., with feedback of a sensed variable indicative or otherwise a measure of the combustion process itself in some way, such as the use of an exhaust gas temperature parameter, an amount of oxygen in the exhaust parameter, a fuel pressure parameter, etc.). These two control strategies, as implemented in the art, have certain disadvantages.

Regarding known open loop air-fuel ratio control systems, a carburetor is typically used as the air and fuel delivery TJD apparatus. The carburetor, due to the mechanics of the apparatus itself, fixes the ratio of air and fuel. In the open loop approach, the system is adjusted to an air-fuel ratio near the lean power loss/misfire limit. However, during operation, the degree of optimization actually realized varies depending on a variety of factors, such as changes in engine load, changes in relative humidity, changes in fuel characteristics (e.g., BTU per SCF, flame speed, hydrogen content, etc.), changes in atmospheric conditions, and the like. Inasmuch as open loop control does not use any feedback, the degree of air-fuel ratio "optimization" is left to the vagaries of system calibration drift, mechanical mixing limitations of the carburetor itself, mechanical degradation and changes in combustion variables such as ambient air conditions and changes in fuel characteristics. Maintaining an acceptable degree of air-fuel ratio optimization requires routine maintenance and calibration, which can become costly and invasive. In addition, there are reliability concerns. In particular, the engine can operate at air-fuel ratios rich of the lean power loss/misfire limit, but cannot operate at all at air-fuel ratios lean of the lean power loss/misfire limit. Therefore, when variations, due to the above factors, occur tending to lean the already predetermined "lean" air-fuel ratio provided to the engine, drastic drop offs of power output may be observed, with operation of the engine becoming erratic. In the worst case scenario, the engine may stop operating all together. Inasmuch as this situation is commercially unacceptable, the air-fuel ratio adjustment is configured so as to leave the air-fuel ratio richer than an optimal "lean" air-fuel ratio by a predetermined guard or safety margin. This safety margin is to allow for the above-described degradation in air-fuel control that could result in air-fuel ratios lean of the lean power loss/misfire limit being provided to the engine. The disadvantage of including this guard or safety margin is an increase in fuel consumption, which thereby directly increases $CO_2$ emissions, as well as elevates combustion temperatures (which increases $NO_x$. Known open loop control strategies have thus been found unsatisfactory in the foregoing respects.

Known closed loop control strategies have similar disadvantages. In known closed loop systems of the type including, for example, a carburetor, a sensor (e.g., such as an exhaust oxygen sensor or an exhaust temperature sensor) is used. The sensor provides a sensed variable signal that is indicative of the combustion process. The sensed variable signal is used in the control strategy to adjust the air-fuel ratio of the charge provided to the engine. However, one disadvantage of such a system is that the control of the air-fuel ratio can only be as accurate as the sensor output itself. Second, while such a sensor does measure a combustion-related event, it does not directly measure lean power loss/misfire, per se. A third disadvantage involves the fact that this approach is unable to detect (and thus track) factors such as ambient atmospheric changes, changes in fuel characteristics or traits (e.g., BTU per SCF, flame speed, hydrogen content, etc.), and sensor degradation/drift. A fourth disadvantage involves the fact that such sensor-based systems require regular calibration and I maintenance checks, which increases maintenance costs. A fifth disadvantage is that such systems have an undesirable failure mode (i.e., sensors may fail in an undesirable fashion, rendering the engine inoperative). Sixth, as the engine itself changes with condition (e.g., wear), desired target values change (to which the system is controlled using the sensor output) and failure to make ongoing compensation to the predetermined "target" values will cause the controlled air-fuel ratio to deviate from the programmed optimum.

Therefore, to avoid reliability problems, such closed-loop systems are operated at less than an optimal air-fuel ratio by including a guard or safety margin. As noted above, including a "safety" margin generally results in increased fuel consumption, increased $CO_2$ emissions, as well as elevated combustion temperatures (with the resulting undesirable effects thereof noted above). Moreover, many of the known closed-loop control systems employ a control action that is digital in nature (i.e., adjustments are made based on whether a sensor output is higher or lower than a threshold value). This "dithering" has in many instances an undesirable response characteristic.

Thus, there is a need to provide an improved system and method for controlling a gaseous-fueled stationary internal combustion engine that overcomes or minimizes one or more of the above-mentioned problems.

SUMMARY OF THE INVENTION

This invention provides for reliable, accurate control of an internal combustion gaseous-fueled engine in a manner that simultaneously reduces fuel consumption, oxides of nitrogen ($NO_x$) emissions, and carbon dioxide emissions ($Co_2$). An engine controlled in accordance with this invention uses approximately ten percent (10%) less fuel than conventional stoichiometric controlled engines (i.e., an engine controlled for stoichiometric operation equipped with a catalytic converter). Reduced fuel consumption also results in about a ten percent (10%) decrease in $CO_2$ emissions. Furthermore, the present invention allows a lower cooling burden than stoichiometric air-fuel engine operation of approximately ten percent (10%) to fifteen percent (15%), thereby reducing thermal stress on components in the combustion path with exhaust temperatures reduced, in one embodiment, by approximately 125° F. The invention reduces overall fuel consumption, use of resources (e.g., fuel, cooling power, fired path engine parts last longer, etc.), while broadly reducing both $CO_2$, and $NO_x$ emissions, both gases of which have a deleterious effect on the environment. Moreover, an engine controlled in accordance with the present invention operates at a lean power loss/misfire limit—an optimum air-fuel ratio. Preferably, an engine operating in accordance with the present invention operates over a defined engine operating envelope wherein emissions of $NO_x$ and $CO_2$ are known and can be monitored if needed by an emissions monitoring system.

In accordance with the present invention, a control system is provided for a gaseous-fueled stationary internal combustion engine having an air and fuel delivery apparatus in communication with combustion chambers of the engine. The control system comprises a governor, a fuel control valve, and a computing device. The governor is configured to adjust the air and fuel delivery apparatus in response to a first signal corresponding to a desired engine operating parameter and a second signal indicative of an actual engine operating parameter. The governor is further configured to output a third signal indicative of an opening position of the air and fuel delivery apparatus. The fuel control valve is disposed intermediate a supply of fuel and the air and fuel delivery apparatus. The computing device is configured to generate a fourth signal, which is provided to the control valve, for adjusting the valve. The fourth signal is computed in response to (i) the third signal (i.e., governor output corresponding to the opening position); (ii) a lean combustion control map; (iii) a fifth signal indicative of engine speed; and, (iv) a sixth signal indicative of engine torque. Adjustments of the control valve results in adjustments of a fuel flow therethrough. In one embodiment, the fuel is adjusted (which in turn causes the governor to impose a corresponding change in the opening position of the air and fuel apparatus) so as to obtain a ratio of air to fuel provided to the engine that is lean of a stoichiometric air to fuel ratio of the engine.

In a preferred embodiment, the control valve adjusts fuel flow so as to obtain a ratio of air to fuel that is substantially at a lean misfire limit of the engine.

A primary advantage of the present invention is that over a broad range of engine operation (at high rated power output), the engine is operated with the air and fuel delivery apparatus at "wide open throttle" (WOT). Power can be adjusted by control of the fuel amount by way of the control valve. Operating the delivery apparatus at WOT reduces "pumping losses." In a constructed embodiment, the lean combustion control map is populated with predetermined data to achieve the above-mentioned WOT operation. In this operating mode, the need for accurate sensing of any engine operating measurements diminishes in importance.

When the power required of the engine is such that it cannot be operated with the air and fuel delivery apparatus in a WOT state, operation at the lean misfire continues to occur. In particular, the control established by the present invention continues to operate the engine at the lean power loss/misfire limit by controlling fuel independent of the air and fuel delivery apparatus through control of the fuel control valve. Again, preferably, the lean combustion control map is populated with parameter values configured to achieve the foregoing result.

In another aspect of the present invention, a method of operating a governed internal combustion gaseous-fueled engine is provided which includes five basic steps. The first step involves determining a governor sensed variable, preferably an engine speed parameter, and an engine torque parameter. The next step involves selecting a prime governor output set-point (PGOSP) parameter from a lean combustion control map using the engine speed and engine torque parameters. The PGOSP parameter is preferably expressed as a percentage of wide open throttle. Next, determining a final governor output set-point (FGOSP) parameter using the selected PGOSP parameter. The next step involves sensing a governor output (GO %) parameter indicative of an opening position of an air and fuel delivery apparatus for the engine. Preferably the GO % is expressed as a percentage. In one embodiment where the air and fuel delivery apparatus comprises a carburetor, a governor output parameter of 100% corresponds to a wide open throttle (WOT) position of a carburetor throttle valve, while a governor output parameter of zero percent (0%) corresponds to a fully closed position. In one embodiment, the FGOSP parameter is a target for optimal lean operation of the engine. Finally, the last step involves decreasing fuel to the engine using a control valve intermediate a fuel supply and the air and fuel delivery apparatus when the final governor output set point (FGOSP parameter expressed as % of WOT) is less than the actual governor output parameter (GO %). The decrease in fuel causes the governor to increase the opening position of the air and fuel delivery apparatus in order to maintain engine speed, thereby "leaning" the mixture.

In a further embodiment, the method further includes the step of defining values for the PGOSP parameters that populate the lean combustion control map. The values are defined such that the control valve (under control of the computing device) is controlled to adjust fuel flow therethrough so as to obtain a ratio of air to fuel provided to the engine that is substantially at a lean misfire limit of the engine.

In yet another embodiment, the step of decreasing fuel includes the substep of generating a control signal to adjust the control valve using a proportional-integral-derivative (PID) controller having at least two (2) inputs: the FGOSP parameter and the GO % parameter. In a preferred implementation, the PID controller is configured to have a slower response than the control action of the governor.

Other objects, features and advantages will become clear or will be made apparent during the course of the following description of a preferred and other embodiments of the present invention.

BRIEF DESCRIPTION OF THE DRAWINGS

FIG. 4 shows an exemplary lean combustion control map;

FIG. 5 shows an exemplary ignition control map;

FIG. 6 shows an exemplary biasing control map;

DETAILED DESCRIPTION OF THE PREFERRED EMBODIMENTS

Figure 1:
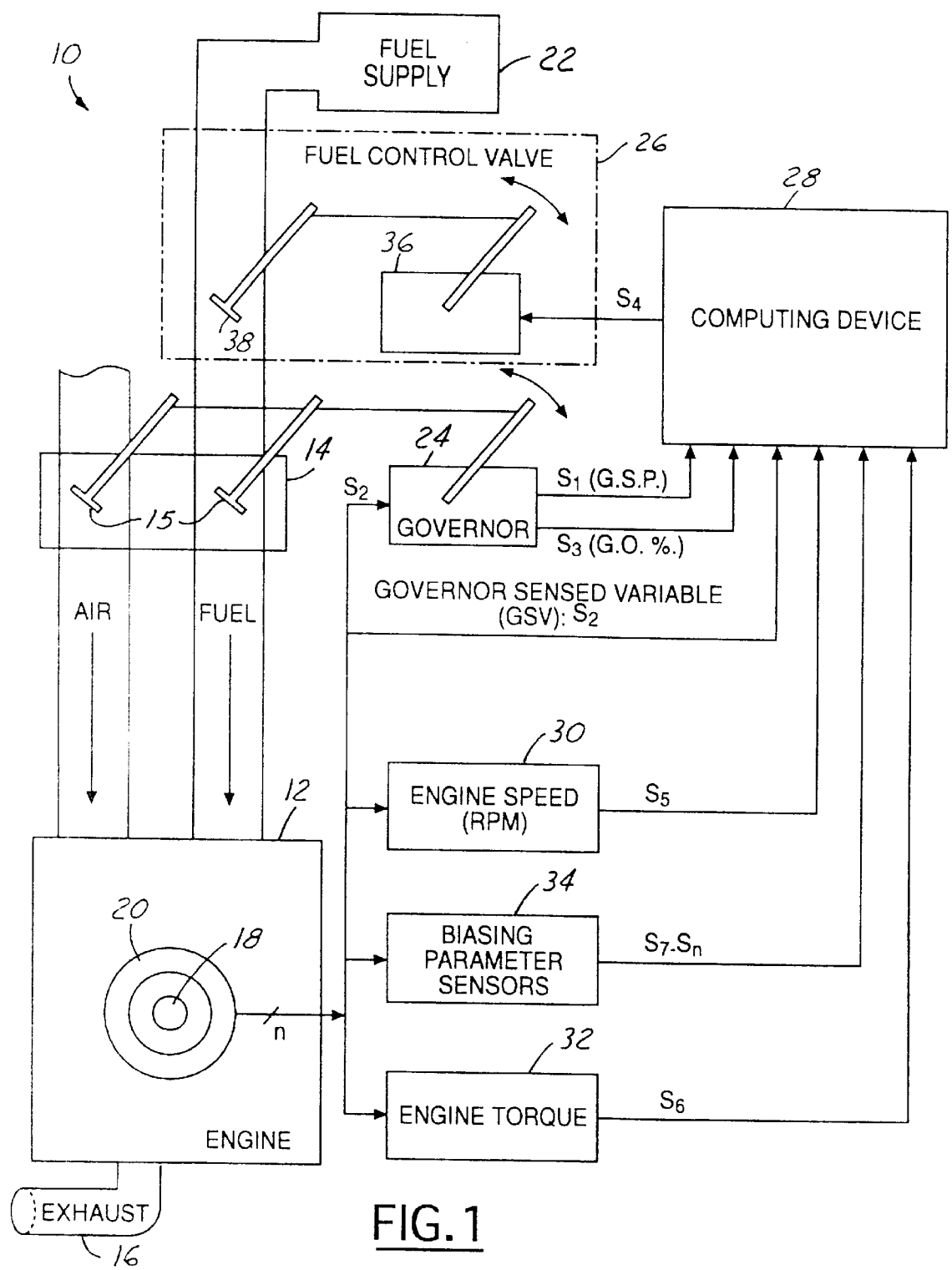
FIG. 1 is a combined block and diagrammatic view of a system in accordance with the present invention for controlling the S operation of a stationary reciprocating gaseous-fueled internal combustion engine.

Before proceeding to a description of the invention referenced to in the drawings, some basic definitions and a general overview of the control established by the present invention will be set forth.

The term stoichiometric means a chemical reaction where there is neither an excess nor a shortage of reactants. In hydrocarbon-fueled engines, this is typically where there is neither an excess nor shortage of air to wholly combust the fuel.

The term lean shall mean, in combustion, where there is more air to fuel than stoichiometric.

The term rich shall mean, in combustion, where there is less air to fuel than at stoichiometric.

The term misfire shall mean that point where an engine cylinder does not fire consistently, often related to an air-fuel ratio of the charge being combusted.

The term Engine Operating Envelope is an operating range of engine speeds and engine torques, and may include ranges of temperatures, fuels, ambient pressures, etc.

It is a general characteristic of gaseous-fueled internal combustion engines that they can be operated at air-fuel ratios lean of stoichiometric, not producing the power called for, but not yet lean enough to be at the lean misfire limit. That is, gaseous-fueled engines lose power (sometimes referred to as a loss of reserve power capacity) when operated extremely lean of stoichiometric before operating erratically. In addition, it is known that reciprocating internal combustion engines expend and thus lose energy to ingest air for combustion, cooling and scavenging purposes. This lost energy is commonly referred to as "pumping losses." The more restricted an air inlet is, the higher the pumping losses. For this reason, it would be desirable to operate an engine with its air and fuel delivery apparatus as unrestricted (i.e., open) as possible. In the art, however, the ability to operate with an unrestricted ("wide open") air and fuel delivery apparatus is compromised in that many such air and fuel delivery apparatuses depend on a reduction in air pressure to ingest fuel, and then mix the fuel and air together. Alternatively, other known air and fuel delivery apparatuses cannot operate at the optimal point to minimize pumping losses without (i) a multitude of sensors and (ii) a richer than optimal air to fuel ratio (a safety margin) to ensure that the engine is not operated too lean (i.e., excessive misfire or stall).

The control system in accordance with the present invention improves fuel efficiency by reducing pumping losses of the engine. Pumping losses are reduced by operating the engine at wide open throttle (WOT), or as wide open as possible for any particular power setting. A reduction in pumping losses has the direct effect of reducing the total amount of fuel consumed, which in turn reduces emissions of $CO_2$ in proportion to fuel consumption (assuming a carbon-containing fuel is used). The reduction in fuel consumption is also operative to reduce heat rejected to the heat cooling system, which reduces horsepower required to cool the engine, or, releasing cooling constrained horsepower. In addition, reducing fuel consumption also reduces the thermal stress on engine parts in the fired gas path (e.g., valves, pistons, rings, heads, etc.).

In addition, the invention also provides the benefit of an increase in mass of the cylinder charge for a fixed amount of fuel. Increasing the mass has a direct effect in reducing the formation of oxides of nitrogen ($NO_x$), an Environmental Protection Agency (EPA) criteria air pollutant. A reduction is observed because the formation of $NO_x$ is primarily a function of time and temperature. The formation of $NO_x$ versus temperature increases logarithmically. Thus, by increasing the amount of air for a fixed amount of fuel, the combustion temperature is lowered, because there is a larger mass available to absorb the heat of combustion. Since the formation of $NO_x$ is logarithmic, even a modest reduction in combustion temperature has a dramatic effect on the formation of $NO_x$. Thus, since a control system in accordance with the present invention maximizes the amount of air into the combustion chamber, it has the positive effect of reducing $NO_x$. Moreover, since the amount of air is maximized, the combustion chamber is cooled by the added scavenging. Moreover, post-combustion free radicals are better purged from the cylinder. In addition, since combustion is operating at a very lean air-fuel ratio, the combustion process is more detonation resistant due to the lower flame speed and cooler components (exhaust valves in particular).

Referring now to the Figures wherein like reference numerals are used to identify identical components in the various views, FIG. 1 shows a control system 10 in accordance with the present invention for controlling an engine 12. In a preferred embodiment, engine 12 comprises a gaseous-fueled stationary reciprocating internal combustion engine 12. Engine 12 is not a relatively small displacement engine of the type used in self-propelled vehicles such as automobiles, but rather, is a relatively large displacement, stationary engine. Such engines are adapted, in a preferred environment, for use at a compressor station to provide sufficient fluid power to ensure the proper progress of a transported fluid, for example, natural gas, through a pipeline (not shown). Such an environment is known, as described and illustrated in U.S. Pat. No. 5,703,777 to Buchhop et al., entitled "Parametric Emissions Monitoring System Having Operating Condition Deviation Feedback," owned by the common assignee of the present invention, and herein incorporated by reference in its entirety. Each compressor station may include plurality of engines 12. Moreover, it should be understood that there may be a plurality of compressor stations along a section of the pipeline. Engine 12 may be a reciprocating type engine comprising conventional and well-known components such as is available from, for example, Ingersoll-Rand as either a Small V-type Gas (SVG) engine, or a King-size V-type Gas (KVG) engine. It should be understood, however, that the present invention may be usefully applied in applications, such as where engine 12 drives electric generators, irrigation pumps, and the like. In addition, the present invention may be usefully applied to engine 12s having a broad range of displacements.

Figure 2:
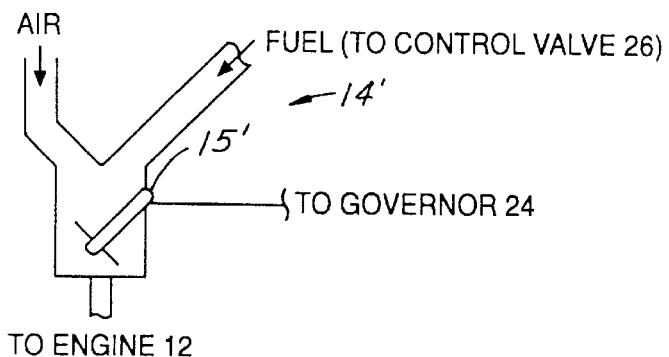
FIG. 2 is a diagrammatic view of an alternate, carburetor embodiment of the air and fuel delivery apparatus illustrated in FIG. 1.

Engine 12 comprises an air and fuel delivery apparatus 14 having one or more throttle valves 15, and which in a constructed M;9 embodiment comprises a carburetor 14' having a throttle valve 15 (carburetor 14' best shown in FIG. 2). Engine 12 further comprises an exhaust manifold 16, an output shaft 18, a flywheel 20, and a plurality of combustion chambers (not shown).

The air and fuel delivery apparatus 14 is in communication with the combustion chambers of engine 12 and has an air inlet coupled to an air supply (not shown), and has a fuel inlet configured to receive fuel originating from a fuel supply 22.

Apparatus 14 (or 14') is adjusted to control the air and fuel delivered to the combustion chambers of engine 12. Apparatus 14 (or 14') may also comprise conventional and known apparatus such as a mixer, fuel injector(s) and the like.

FIG. 1 also shows control system 10. Control system 10 according to the invention includes a governor 24, a fuel control valve 26, an air fuel computing device 28, a means or circuit 30 for determining a governor sensed variable preferably engine speed, a means or circuit 32 for determining engine torque, and a means or circuit 34 for determining a plurality biasing parameter values.

Governor 24 is configured to adjust air and fuel delivery apparatus 14 in response to a first signal (designated $S_1$ in the drawings) corresponding to a desired engine operating parameter, and further in response to a second signal (designated $S_2$) indicative of an actual engine operating parameter. Herein the second signal $S_2$ comprises a governor sensed variable (GSV) and will be referred to as the governor sensed variable $S_2$ or simply GSV. Also, the first signal $S_1$, comprises a governor set point (GSP) parameter and will be referred to as the governor set point signal $S_1$ or simply GSP.

In a constructed embodiment, the GSP parameter corresponds to a desired engine speed (e.g., target engine RPM) while the GSV parameter corresponds to an actual engine speed (i.e., actual engine RPM). In one configuration, an operator of engine 12 inputs a desired engine speed, as well as a desired engine torque (which may occur in stepwise increments but which may also occur in a stepless analog fashion) to define a power output for engine 12.

Governor 24 is further configured to output a third signal (designated $S_3$) indicative of a governor output position.

The governor output position corresponds to an opening position of air and fuel delivery apparatus 14 inasmuch as the two are mechanically coupled. In the embodiment wherein engine 12 includes carburetor 14' (FIG. 2) having throttle valve 15 associated therewith, third signal $S_3$ comprises a governor output (GO %) parameter indicative of the relative opening of throttle valve 15 (expressed as a percentage of wide open throttle). A 100% value for GO % corresponds to a wide open throttle (WOT) position for throttle valve 15 and a 0% value for GO % corresponds to a fully closed position for throttle valve 15.

It should be understood by those of ordinary skill in the art that for most engines 12, the GSV parameter comprises sensed engine speed; however the GSV parameter may be one selected from the group consisting of a sensed engine speed, a sensed engine ignition events per unit time, and a sensed air and fuel delivery apparatus air vane force, among others. Likewise, the GSP parameter will be described in a preferred embodiment as comprising a predetermined engine speed; however, it should be understood that the GSP parameter may be one selected from the group consisting of a predetermined engine speed, a predetermined engine ignition events per unit time, and a predetermined air and fuel delivery apparatus air vane force, so as to match up and correspond with the selected GSV parameter. Governor 24 may comprise conventional and well-known apparatus.

Governor 24 may itself be a stand-alone device, or may be implemented (e.g., through software) in computing device 28. It is shown as a separate block in the Figures for clarity only to emphasize the independent function it performs. Governor 24 may control air and fuel delivery apparatus 14 in accordance with known control approaches, such as via a Proportional-Integral-Derivative (PID) control approach. Its response characteristics can therefore be programmed or otherwise configured to attain the desired response.

Fuel control valve 26 is disposed intermediate fuel supply 22 and air and fuel delivery apparatus 14. In a preferred embodiment, fuel control valve comprises a proportional control valve 26 which includes an electromagnetic portion such as an actuator 36, and a regulating plate or the like 38 operating in unison therewith to adjust the flow of fuel through the valve. Proportional control valve 26 may comprise conventional and known components. Computing device 28 is configured to generate a fourth signal (designated $S_4$) for adjusting valve 26 in response to the following signals and in a manner to be described hereinafter: (i) the GO % parameter; (ii) a lean combustion control map, such as map 40 (best shown in FIG. 4); (iii) a fifth signal (designated $S_5$) indicative of engine speed from engine speed determining means 30; and, (iv) a sixth signal (designated $S_6$) indicative of engine torque generated by engine torque determining means 32. Control valve 26 is responsive to fourth signal $S_4$ for adjustment of a fuel flow therethrough so as to obtain a ratio of air to fuel provided to engine 12 that is lean of a stoichiometric air to fuel ratio of engine 12, or, preferably, at a lean power loss/lean misfire limit.

Computing device 28 includes central processing means (not shown), Random Access Memory (RAM) (not shown), Read-only Memory (ROM) (not shown), and an Input/Output (I/O) interface (not shown). Computing device 28 is configured to store predetermined data, for example in RAM or ROM, for operating and control of engine 12. Computing device 28, in accordance with known practice, can perform electronic signal processing involving logic and programmed computations. For purposes of example only, computing device 28 may be programmed to control certain functions pertaining to the operation of engine 12 not directly related to air and/or fuel, such as ignition timing.

FIG. 5 shows ignition table 42 having timing entry values 44 (preferably in degrees relative to top dead center (TDC), positive values being degrees before TDC). These timing values 44 may be retrieved and used based on the actual engine speed and engine torque as input parameters.

With continued reference to FIG. 1, computing device 28 may comprise conventional and known apparatus, such as a 3300 series device, in particular model No. 3350, commercially available from the Bristol Babcock Company, which is an analog-controlled digital computer. It should be understood that there are a plurality of alternative computing devices commercially available and known to those of ordinary skill in the art suitable for use in practicing the present invention.

FIG. 1 further shows means 30 for determining the GSV parameter, which preferably includes means for determining an engine speed (expressed in RPM) parameter. It should be understood from the above-described alternatives for the GSV parameter that corresponding alternative means or circuits may be suitably employed. In a preferred embodiment, where the GSV parameter comprises engine speed, means 30 may include conventional and known engine RPM sensors, which generate an output signal indicative of the sensed engine speed.

Engine torque determining means 32 is configured to generate sixth signal $S_6$ indicative of the torque being produced by engine 12. Means 32 may comprise conventional and known torque sensing components for directly measuring engine torque. In an alternative embodiment, means 32 may comprise means for indirectly measuring engine torque, such as sensor outputs and programming to implement a so-called fuel torque method using engine speed and fuel flow parameters as inputs, as described in U.S. Pat. No. 5,703,777 entitled "Parametric Emissions Monitoring System Having Operating Condition Deviation Feedback", assigned to the common assignee of the present invention. Further alternative approaches may be employed, as known to those of ordinary skill in the art.

Means 34 for generating biasing parameter signals $S_7$–$S_n$ may comprise conventional and known sensors for generating various signals to be used by the present invention in a manner to be described in detail hereinafter. Signals $S_7$–$S_n$ comprise air manifold temperature (AMT), air manifold pressure (AMP), relative humidity (R/H), barometric pressure (Pa), exhaust manifold pressure (EMP), torque (Tq), air to fuel ratio (A/F ratio), ignition timing (IGN*), percent oxygen in exhaust (% $O_2$), grams per BHP-Hr of Nitric Oxides in exhaust (GBHH $NO_x$), exhaust gas temperature (EGT), RPM standard deviation (RPM dev.), cylinder combustion pressure (CCP), and energy content of the fuel (BTU). Accordingly, means 34 includes structure and/or components and/or circuitry, conventional and known in the art, to sense or otherwise determine the foregoing parameters and generate a parameter indicative signal, designated $S_7$–$S_n$.

Figure 3:
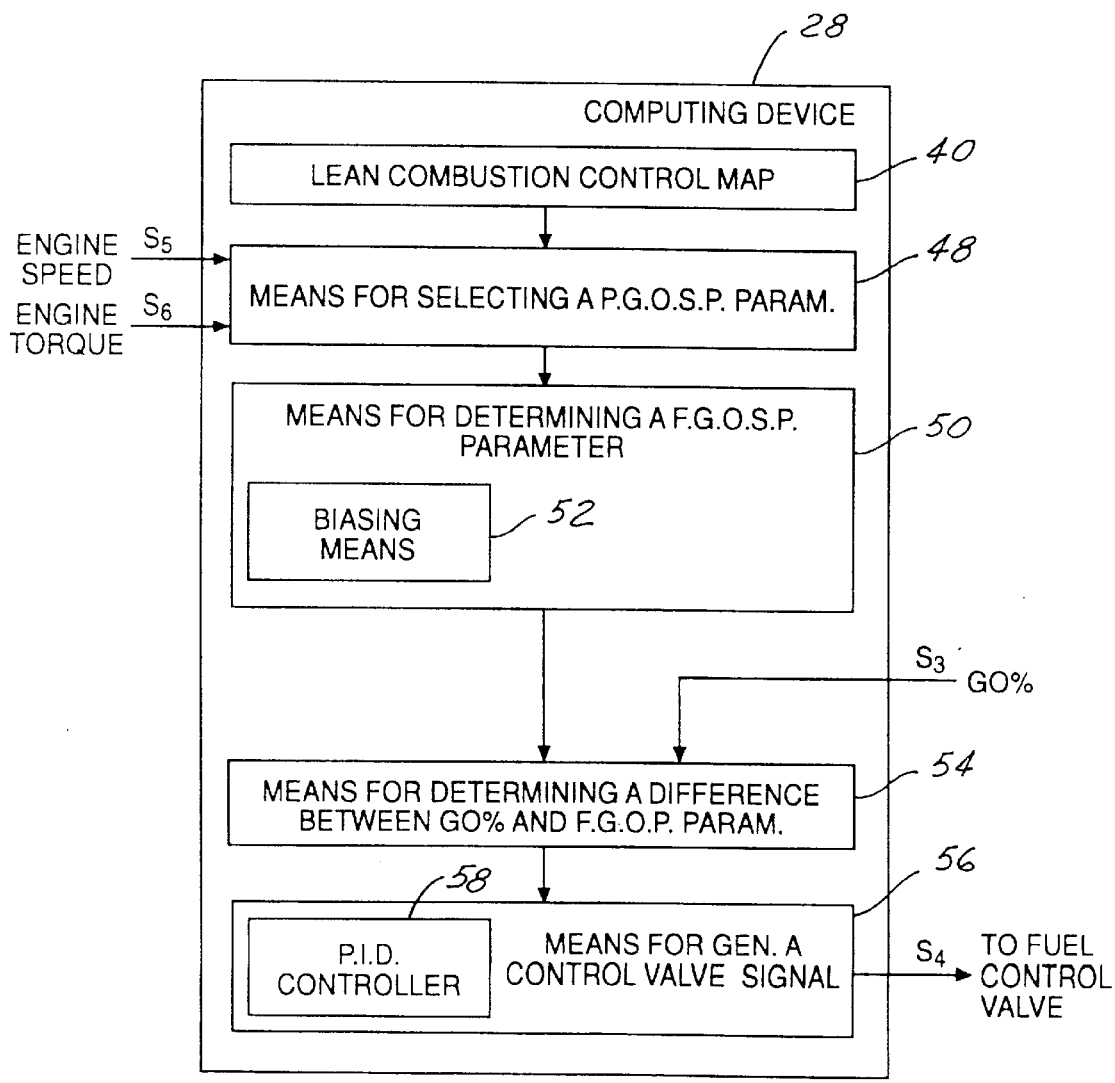
FIG. 3 is a simplified block diagram depicting, in further detail, the computing device shown in FIG. 1.

FIG. 3 shows computing device 28 in greater detail. As described above, computing device 28 may be configured by way of programming to perform a variety of logic functions and predetermined computations. For example, Appendix A hereto shows programming code used in a constructed embodiment, such code being written as a programming language referred to as the ACCOL programming language established by the Bristol Babcock Company. Computing device 28, in accordance with the present invention, includes data comprising lean combustion control map 40, including a plurality of prime governor output set-point (PGOSP) parameters 46 (best shown in FIG. 4, and expressed as a %). Computing device further includes means or circuit 48 for selecting one of the plurality of PGOSP parameters as a function of engine speed and engine torque, means or circuit 50 for determining a final governor output set-point (FGOSP) parameter (expressed as a %) which may optionally include means or circuit 52 for biasing the selected PGOSP parameter, means or circuit 54 for determining a difference between the governor output signal $S_3$ (expressed as a %) and the FGOSP parameter (also as a %), and means or circuit 56 for generating fuel valve control signal $S_4$, which may include a proportional-integral-derivative (PID) controller 58 configured to generate fourth signal $S_4$.

In one embodiment, the PGOSP parameters 46 are selected such that valve 26 is controlled (according to fourth control signal $S_4$) to adjust fuel flow therethrough so as to obtain a ratio of air to fuel that is lean of a stoichiometric air to fuel ratio of engine 12. In a preferred embodiment, however, the PGOSP parameters 46 are configured so as to obtain a ratio of air to fuel provided to engine 12 that is substantially at a lean misfire limit of engine 12. As shown in FIG. 4, the PGOSP parameter values correspond to an air and fuel delivery apparatus opening position expressed as a percentage of wide open throttle.

The method for determining values for PGOSP parameters 46 to populate control map 40 can be accomplished in a selected one of at least two ways: (i) using empirical data from tests; and (ii) utilization of mechanical and thermodynamic models.

Regarding the empirical data approach, it is generally necessary to make engine performance measurements for each engine type to be controlled in accordance with the invention. To populate map 40, an engine similar in type to the selected engine (i.e., similar to engine 12) is operated over its user defined engine operating envelope (EOE). It should be understood that both the range of map 40 (i.e., lowest to highest engine speed torque), as well as its resolution (i.e., increment or delta value), may be selected in accordance with the required performance. The range and resolution of the map 40 shown in FIG. 4 was found satisfactory for an actual Ingersoll-Rand brand SVG engine. Acquisition of the empirical data can be commenced by operating the engine at full rated power (highest engine torque/speed product). It is well known that the product of engine torque and engine speed is engine Brake horsepower (BHP). This starting point has the benefit of guiding the user as to the range of the map if not already predetermined (e.g., as emission reduction goals and, fuel reduction goals are satisfied, acquisition of further data points may be discontinued). In a preferred embodiment, lean combustion control map 40 is defined as a function of engine torque and engine speed (at a given ambient temperature). As shown in FIG. 4, across the top row is listed the engine torque as a percentage of the maximum rated torque of the engine. Down the first column of FIG. 4 is listed the GSV parameter which, in the map is expressed as a percentage of the maximum rated speed of the engine.

To populate map 40 for a specific speed/torque combination, the engine is operated at that combination according to normal conventional control. For example, the throttle valve may be set to 50% of WOT. Then, the user incrementally reduces fuel to the air and fuel delivery apparatus 14. This fuel reduction may be accomplished in a data acquisition mode by employing a fuel control valve such as valve 26. This fuel reduction in turn reduces the operating speed of the engine. The governor 24 responds by "opening up" air and fuel delivery apparatus 14 further in order to maintain the set engine speed (i.e., the GSP parameter). In this example, the throttle valve may open up to 60%, then 70%, then 80%, and so on. This iterative process (decrease fuel, observe throttle open up) continues until either (i) the governor output is 100% (WOT) (i.e., further decreases of fuel will not result in further "opening up" of the throttle valve) or (ii) a lesser setting is found. The governor output parameter (GO %) is then recorded for that engine speed and engine torque. Regarding what constitutes a suitable "lesser setting" (i.e., less than 100% of WOT), the primary factor is engine performance. That is, the PGOSP shall be the governor output beyond which further "leaning" results in an unacceptable amount of engine speed variation (i.e., RPM instability), a reduction in power below a desired amount or unacceptable engine misfire. Other performance parameters, such as $NO_x$ emissions, fuel consumption, exhaust gas temperature (EGT), thermal stress and cooling system burden, and the like may also be monitored and used to inform the selection of what governor output is recorded. This overall process is repeated for each PGOSP parameter required in map 40.

Regarding utilization of mechanical and thermodynamic models to populate lean combustion map 40, the amount of air for optimal engine operation (i.e., combustion) may be determined using known models. In addition, by knowing the flow characteristics ($C_v$) of the air flow controlling valve (e.g., throttle valve 15) of air and fuel delivery apparatus 14, a throttle valve position can be derived to deliver the predetermined amount of air. This can be thereafter converted to a percentage of wide open throttle for populating map 40.

With continued reference to FIG. 3, PGOSP parameter selecting means 48 may comprise well-known routines for retrieving data (e.g., a PGOSP parameter 46) from a two-dimensional matrix (e.g., map 40) as a function of two input variables (e.g., engine speed indicative signal $S_5$; and, engine torque indicative signal $S_6$).

FGOSP parameter determining means 50 is implemented in a selected one of at least two ways. In a first implementation, the selected PGOSP parameter (i.e., retrieved from map 40 by selecting means 48) directly defines the final governor output set-point (FGOSP) parameter. In a second implementation, however, biasing means or circuit 52 is used to modify the selected PGOSP parameter to yield the FGOSP parameter. A variety of process (e.g., load on a pipeline), engine, and environmental parameters may affect, in some degree, the amount of required air for optimal lean combustion. For example, since the temperature of the intake air in the intake manifold affects the density of the combustion air, it has an effect on the air-fuel ratio. This environmental change thus affects how the PGOSP parameter selected from lean combustion control map 40 controls the operation of engine 12. Accordingly, to account for changes in the air manifold temperature (AMT), a further control map may be provided, in an alternate embodiment. In particular, an AMT control map or table 54 (best shown in FIG. 6) is provided, and defined, for example, using empirical data, the ideal gas law and other thermodynamic data, or a combination(s) thereof. Table 54 contains a multiplicative factor that is used by means $S_2$ to bias the selected PGOSP parameter 46 to arrive at a biased PGOSP parameter (designated BPGOSP). The appropriate bias factor to retrieve from Table 54 is based on the sensed AMT, which may be determined from one of signals $S_7$–$S_n$.

In addition, biasing means 52 may include further maps for improving engine operation. Any engine operating parameter that affects engine performance, but has a consistent effect on such performance, may be, but need not be mapped and used. For example, ignition timing affects engine performance but need not be mapped, assuming it consistently controls engine operation in a known and repeatable fashion.

For any particular engine, should the assumption of consistent affect on engine performance not be true, then a bias map (containing, for example, multiplicative factors) may be implemented to improve engine performance. For example, for a particular engine wherein the ignition timing has a variable effect on engine performance, then an ignition bias map, containing a multiplicative factor, may be generated. The factors can then be used to adjust the PGOSP parameter values 46 from map 40 to produce a biased PGOSP parameter. This biasing technique can be used with any number of parameters such as relative humidity, barometric pressure, etc., as required for a particular engine type. In the empirical approach, all of the respective bias factors are retrieved from the respective maps or tables using one or more of the biasing signals $S_7$–$S_n$, perhaps along with the GSV parameter and engine torque, as indices, and thereafter, all the bias factors are applied in a multiplicative fashion to arrive at a biased PGOSP (BPGOSP) parameter.

It should be understood that the factors in Table 54 in particular, and a biasing factor for any selected operating parameter in general, need not be "multiplicative" in nature. The biasing may occur through evaluation of a function (or a mathematical function), through an additive or subtractive factor, a dividing factor, evaluation of logarithm, taking of a derivative, exponential, etc., or a combination thereof the manner in which the selected operating parameter changes the optimal air-fuel ratio determines the actual relationship used for biasing.

Determining means 50 of computing device 28 is programmed to select either the PGOSP parameter or the biased PGOSP parameter, which then becomes the final governor output set-point (FGOSP) parameter (which is expressed as It should be understood that known programming techniques exist to retrieve data from various biasing tables in accord with the run-time biasing parameter values ($S_7$–$S_n$) as indexes.

With continued reference to FIG. 3, governor output/GFOSP difference determining means 54 may be implemented using arithmetic logic functions available generally in device 28. This "difference" may be viewed as an "error" signal in control theory parlance. The "difference" signal is between the actual throttle plate 15 opening position (GO %) and the desired, target throttle plate opening position (FGOSP) for optimal lean operation.

Fuel valve control signal $S_4$ generating means 56 preferably includes PID controller 58. PID controller 58 is a well understood control block in the field of control theory for generating an output signal (in this case, $S_4$) in a way so as to reduce an "error" signal (e.g., the above-described difference between the GO % and FGOSP parameters). A PID control may be implemented by exercise of known programming practices by one of ordinary skill in the art. For example, if governor output parameter GO % is less than the target (e.g., the FGOSP parameter), then generating means 56 via PID controller 58 adjusts signal $S_4$ so as to decrease fuel flow through valve 26. This causes governor 24 (and its control mechanism) to "open up" or, in other words, increase the actual air and fuel delivery apparatus 14 opening position, which will be reflected in an increased GO % value. This increased GO % reduces the "difference" or "error" signal, as desired. Generating means 56 makes no modifications to signal $S_4$ when the GO % parameter is equal to the FGOSP parameter. Generating means 56 will vary signal $S_4$ when the GO % parameter is greater than the FGOSP parameter so as to increase fuel flow through valve 26, whereby the governor 24 "closes down" throttle plate 15 of apparatus 14 (GO % decreases).

Figure 7:
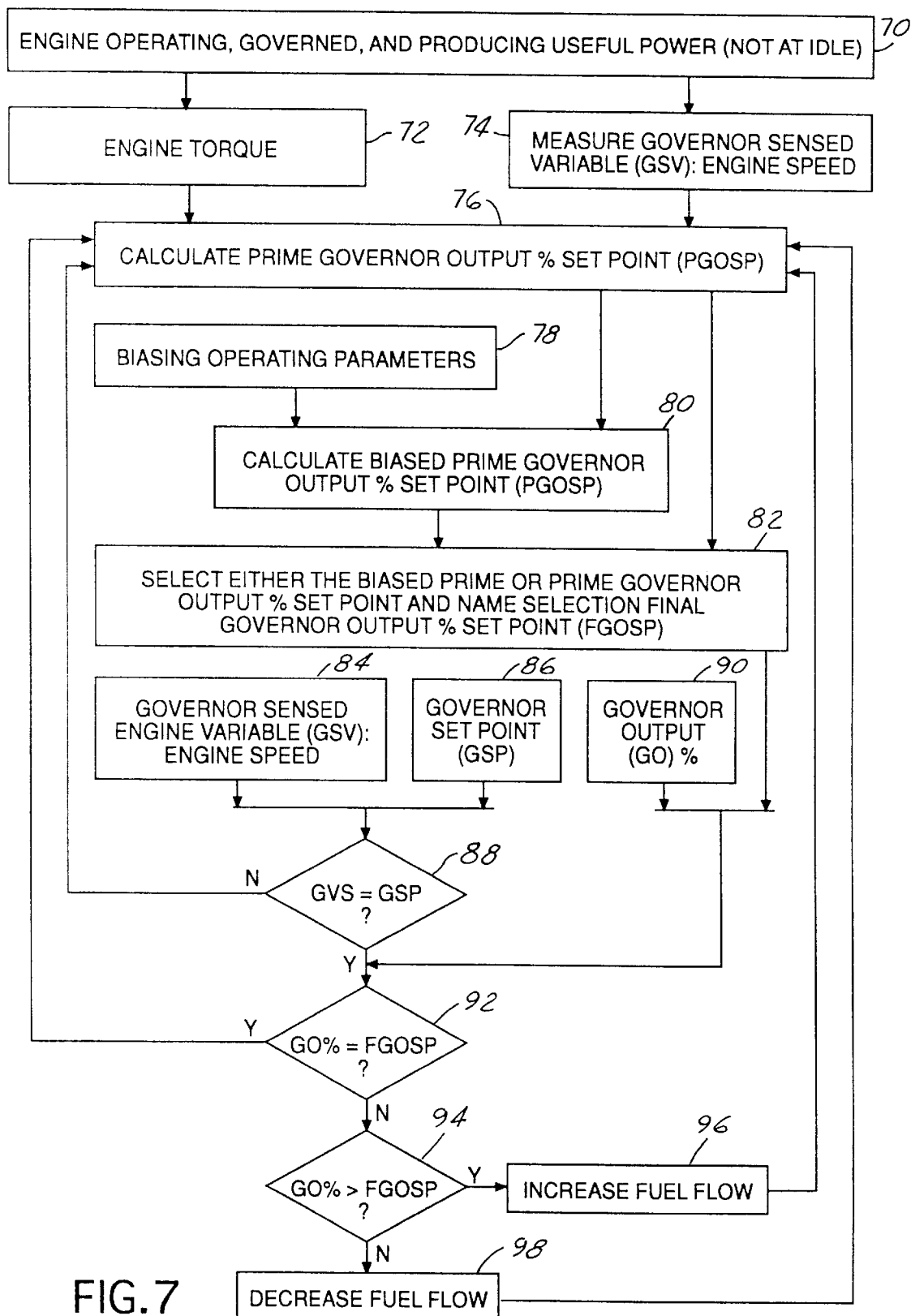
FIG. 7 is a simplified flow chart diagram depicting, in detail, the control established by the embodiment shown in FIG. 1.

Referring now to FIG. 7, an overall description of a preferred embodiment of control system 10 will be set forth. Control system 10 requires that engine 12 be governed in some way (e.g., engine speed governed), and that the default state when no control is imposed is always at least slightly lean of stoichiometric. In step 70, engine 12 is operating, governed, and producing useful power (i.e., not at idle). In particular, "governed" in the preceding sentence means that governor 24 maintains the GSV parameter substantially equal to the GSP parameter. In the preferred embodiment, governor 24 is a speed governor. Further, in a preferred environment, an operator selects a desired engine speed, and the governor operates to maintain the actual speed (GSV) equal to the selected speed (equal to the GSP). Moreover, the user selects a desired engine torque (which may occur in a stepwise fashion, as a percent of rated output torque but which may also occur in a stepless analog fashion).

In step 72, actual engine torque, as sensed by engine torque determining means 32, is determined and is provided to computing device 28 by way of sixth signal $S_6$. In step 74, in the preferred embodiment, engine speed is measured by engine speed determining means 30 and is provided as signal $S_5$ to computing device 28.

In step 76, a prime governor output set point (PGOSP) parameter is determined by computing device 28, using sensed engine torque and sensed engine speed as input indices into lean combustion control map 40. Step 76 is an important step inasmuch as it determines the correct control point to operate engine 12 to achieve an air-fuel ratio provided to the engine at a lean power loss/misfire limit, the engine's most fuel efficient point, as well as the point producing the minimum amount of $NO_x$ and $CO_2$.

Steps 78 and 80 are performed only in yet another alternate embodiment wherein biasing is used. Step 78 involves determining one or more biasing operating parameters using biasing parameter determining means 34 corresponding to a number of various engine operating parameters (OP). These values or signals are provided to computing device 28 as signals $S_7$–$S_n$.

In step 80, a biased prime governor output set point (BPGOSP) is determined by computing device 28, using biasing parameter signals developed in step 78, in a manner described in detail above (e.g., the multiplicative biasing factors found in table 54 of FIG. 6).

In step 82, computing device 28 determines whether to utilize the PGOSP parameter from step 76, or the BPGOSP parameter from step 80, and thereafter generates the final governor output set point (FGOSP) accordingly.

Steps 84, 86 and 88 are performed in still yet another alternate embodiment, and which provides computing device 28 with information regarding the state of operation of engine 12. In particular, step 84 involves measuring the governor sensed variable (GSV), namely engine speed in one embodiment. Step 86 involves identifying the governor set point (GSP) parameter. In step 88, computing device 28 determines whether the GSV parameter is equal to the GSP parameter. These steps (84, 86 and 88) can be utilized and are utilized in this alternate embodiment by computing device 28 to halt further control actions according to the invention, or to alter the rate thereof. In particular, steps 84, 86 and 88 may be profitably employed in situations where disturbances to a steady state operation of the engine may be expected, for example, where large power demand changes have been made on the engine, during start, warm-up, load pick up, load shed, cool down, and stop. It should be appreciated that steps 84, 86 and 88 collectively provide computing device 28 with knowledge of the engine's ability and readiness to accept control established by the present invention. Note that steps 84, 86 and 88 are in the nature of a one shot process. That is, steps 84, 86 and 88 collectively define an optional enabling step, and once completed, need not be repeated during the remainder of the engine operation (except for the above-identified instances where steady state operation may not be attained or where steady state may be disturbed).

In step 90 computing device 28 receives as an input the governor output parameter (GO %).

In step 92, computing device 28, more particularly PID controller 58, compares the governor output (GO %), which corresponds to a percent of WOT of the throttle valve, to the final governor output set point (FGOSP), which is the target percent of WOT. If GO % is equal to FGOSP, then no change is required and the control is returned to step 76. Engine 12 is at governor equilibrium and at the lean power loss/misfire limit thereof. Both governor 24, and PID control 58 are at equilibrium (and have thus satisfied the predetermined respective set points).

Otherwise, if GO % and FGOSP are unequal, control is passed to step 94. In step 94, PID control 58 determines whether the governor output (GO %) is greater than the FGOSP parameter. If so, the process progresses to step 96, wherein signal $S_4$ is adjusted proportionately to increase fuel through valve 26 (and thus to engine 12). The increase in fuel flow accomplished by step 96 enriches the air-fuel ratio and results in an increase in the governor sensed variable GSV (e.g., engine speed in a preferred embodiment). The increase in engine speed causes governor 24 to "close down" air and fuel delivery apparatus 14 so as to bring the engine speed to the value of the governor set point (GSP) which is in RPM. Accordingly, the GO % parameter, which is indicative of the throttle valve opening position, increases.

Otherwise the process goes to step 98, which calls for a decrease in fuel flow by adjusting control valve 26. It should be understood that step 96 is repeated in predetermined increments until governor 24 is at equilibrium, with the governor set point (GSP) satisfied (i.e., GSV=GSP), and the final governor output set point FGOSP (calculated by computing device 28) satisfied (i.e., GO %=FGOSP). System 10 thus is at both governor equilibrium, as well as PID controller 58 equilibrium (i.e., operating with air-fuel ratios at the lean power loss/misfire limit of engine 12). The foregoing also applies to step 98.

Another advantage of the invention is the desirable failure mode. Preferably, proportional fuel control valve 26 is selected to fail in an unrestricted or open state (i.e., "on shelf condition"). Thus, should computing device 28 fail, then the fuel control is designed to fail fully open on a loss of signal.

Engine 12 is still governed in a conventional manner, only without the benefit of the air-fuel ratio control established by the present invention. Engine 12 is left operable, and an operator can be notified by an alarm in such an event or the engine may be stopped by the alarm automatically at the option of the operator.

Another advantage of control system 10 is that inasmuch as the engine operating envelope must be defined (e.g., both the speed and torque of the engine are known) for the control to be imposed, the emissions from the engine may be determined, for example, via the methodology described and claimed in U.S. Pat. No. 5,703,777 entitled "Parametric Emissions Monitoring System Having Operating Condition Deviation Feedback." This provides into benefits to users of such engines who must know emissions for record keeping or to ensure emission permit compliance. If the engine health degrades appreciably, operation may become unstable, which may in turn cause an alert to be asserted whereby the operator or control system may take remedial action. While the foregoing description makes reference to the PID controller's 58 interaction to (or iterative reaction with) governor 24, this invention does not require active governor control in all engine operating modes. At high engine power outputs, for example, governor 24 may be driven to 100% output (WOT). In such a mode, the power control of engine 12 is "governed" by the PID controller's 58 regulation of the fuel circuit alone (which is in turn driven by the FGOSP parameter value). This control action transition to and from governor 100% output is seamless, continuous, analog, proportional, bumpless and accomplished without two state (on/off) sensors and "dithering" control action.

A method in accordance with the present invention, described in the foregoing paragraphs, is repeated continuously in an infinitely proportional analog process to maintain engine air-fuel mixture optimized at all times.

Figure 8:
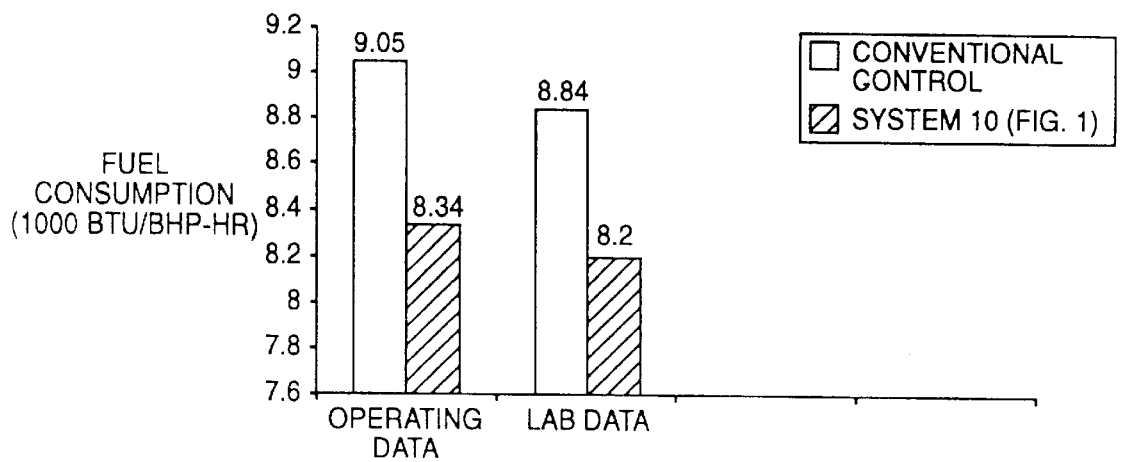
FIG. 8 is a simplified bar chart diagram illustrating a fuel consumption reduction according to the present invention.

FIG. 8 is a simplified bar chart diagram illustrating a fuel consumption reduction of an Ingersoll-Rand SVG type natural gas engine controlled in accordance with the present invention. The chart shows an approximate 8% fuel savings. For an Ingersoll-Rand type KVG natural gas engine, fuel savings varied between 5.8% and at B 7.7% (chart not shown).

Figure 9:
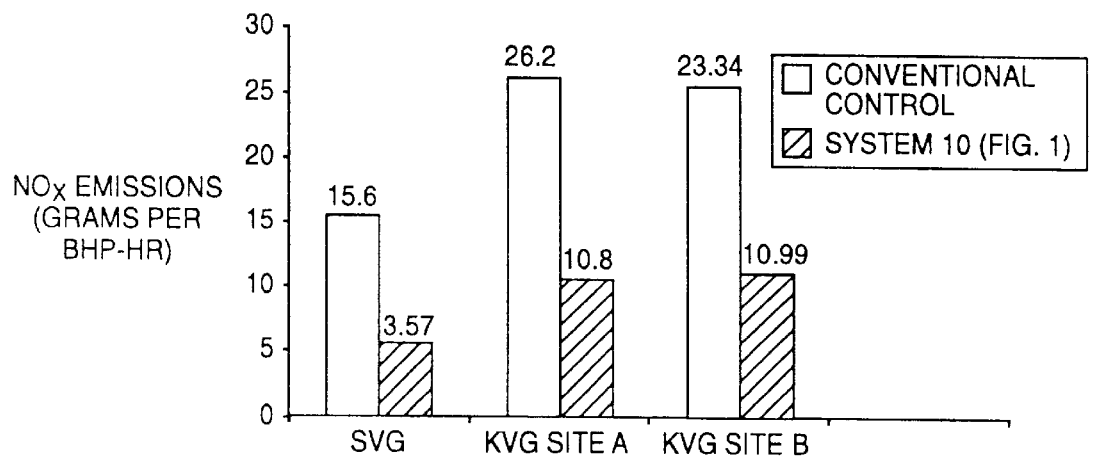
FIG. 9 is a simplified bar chart diagram illustrating a $NO_x$ emission reduction according to the present invention.

FIG. 9 is a simplified bar chart diagram showing reductions in $NO_x$ emissions for an Ingersoll-Rand type natural gas engine controlled in accordance with the present invention. The chart shows $NO_x$ reductions between 53%–77%.

Figure 10:
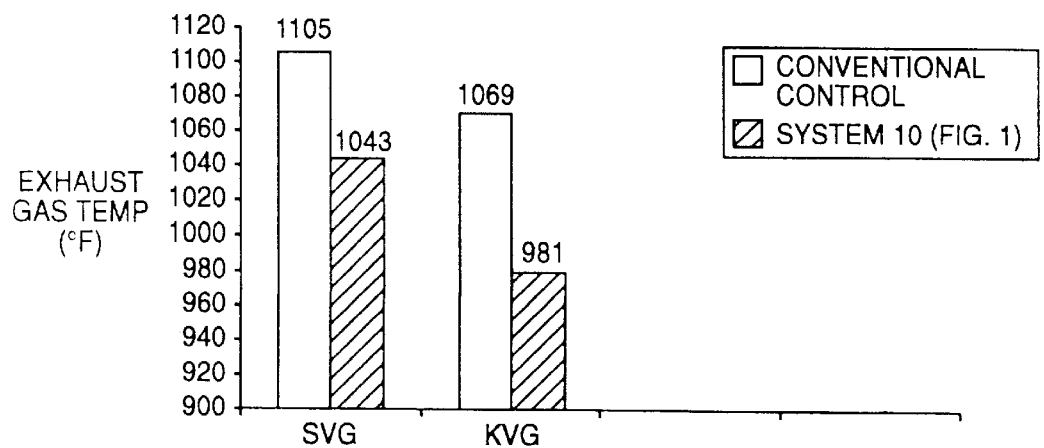
FIG. 10 is a simplified bar chart diagram illustrating an exhaust gas temperature reduction according to the present invention.

FIG. 10 is a simplified bar chart diagram illustrating exhaust gas temperature (EGT) reductions for an Ingersoll-Rand type natural gas engine controlled in accordance with the present invention. The reductions range between 5.9% and 9.0%.

Figure 11:
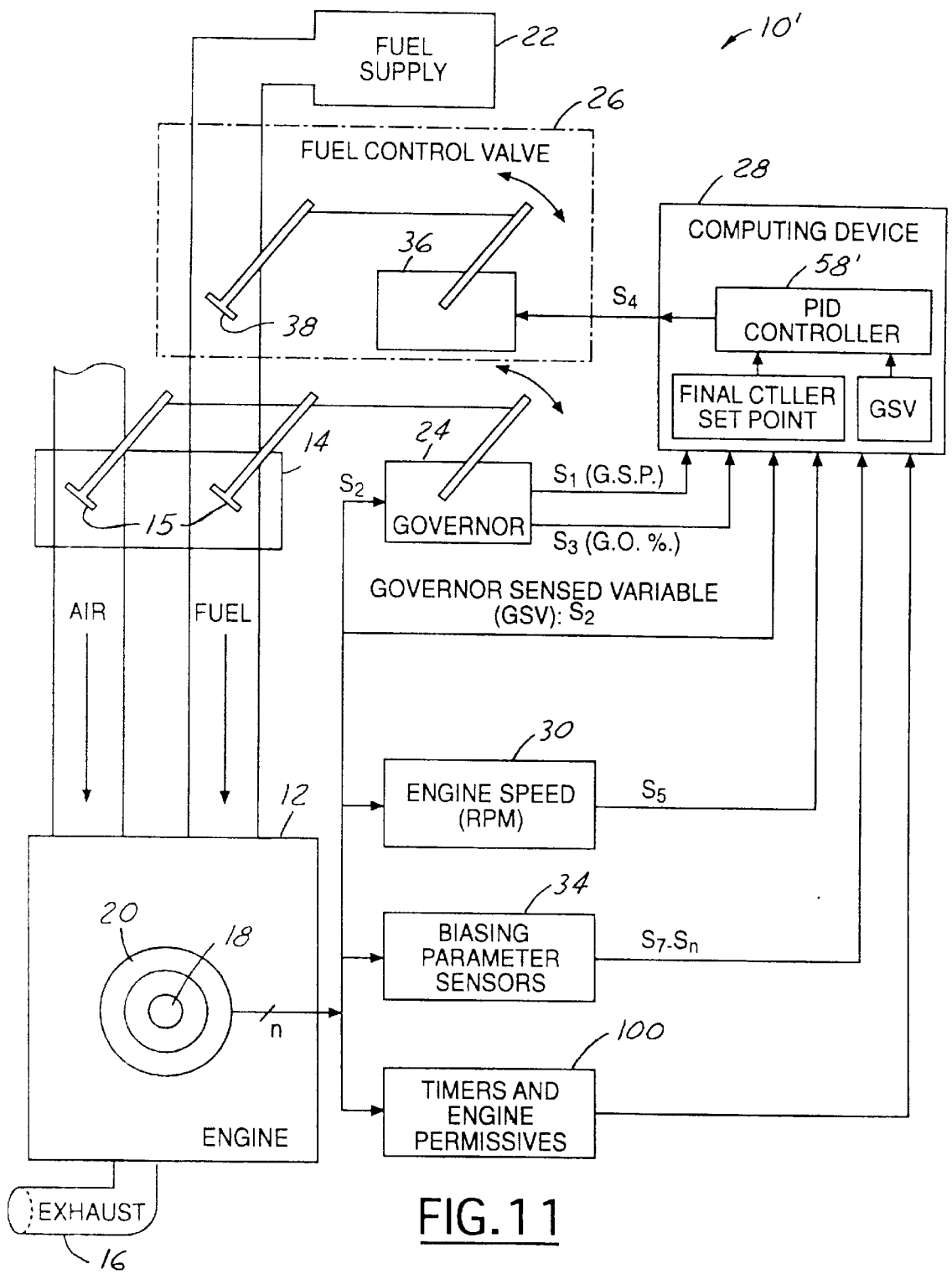
FIG. 11 is a combined block and diagrammatic view of an alternate embodiment for controlling an engine according to the present invention.

FIG. 11 shows an alternate control system embodiment, designated 10'. While control system 10 shown in FIG. 1 may be characterized as a two-input system (governor sensed variable GSV and engine torque), since system 10 uses these parameters as primary control inputs, system 10' shown in FIG. 11 may be referred to as a single input system (governor sensed variable only).

Control system 10' is similar in configuration to control system 10, except that computing device 28 requires only the GSV parameter to implement its control. Only the differences between system 10 and 10' will be described, it being understood that the foregoing description and illustrations of system 10 apply here to system 10' with equal force unless specifically noted to the contrary. Engine torque determining means 32 has been eliminated in control system 10', and has been replaced by block 100 defining a group of timers and engine permissives configured to assure that engine 12 is in a steady state mode (ready to be controlled by control system 10'). Block 100 is not required by control system 10.

Figure 12:
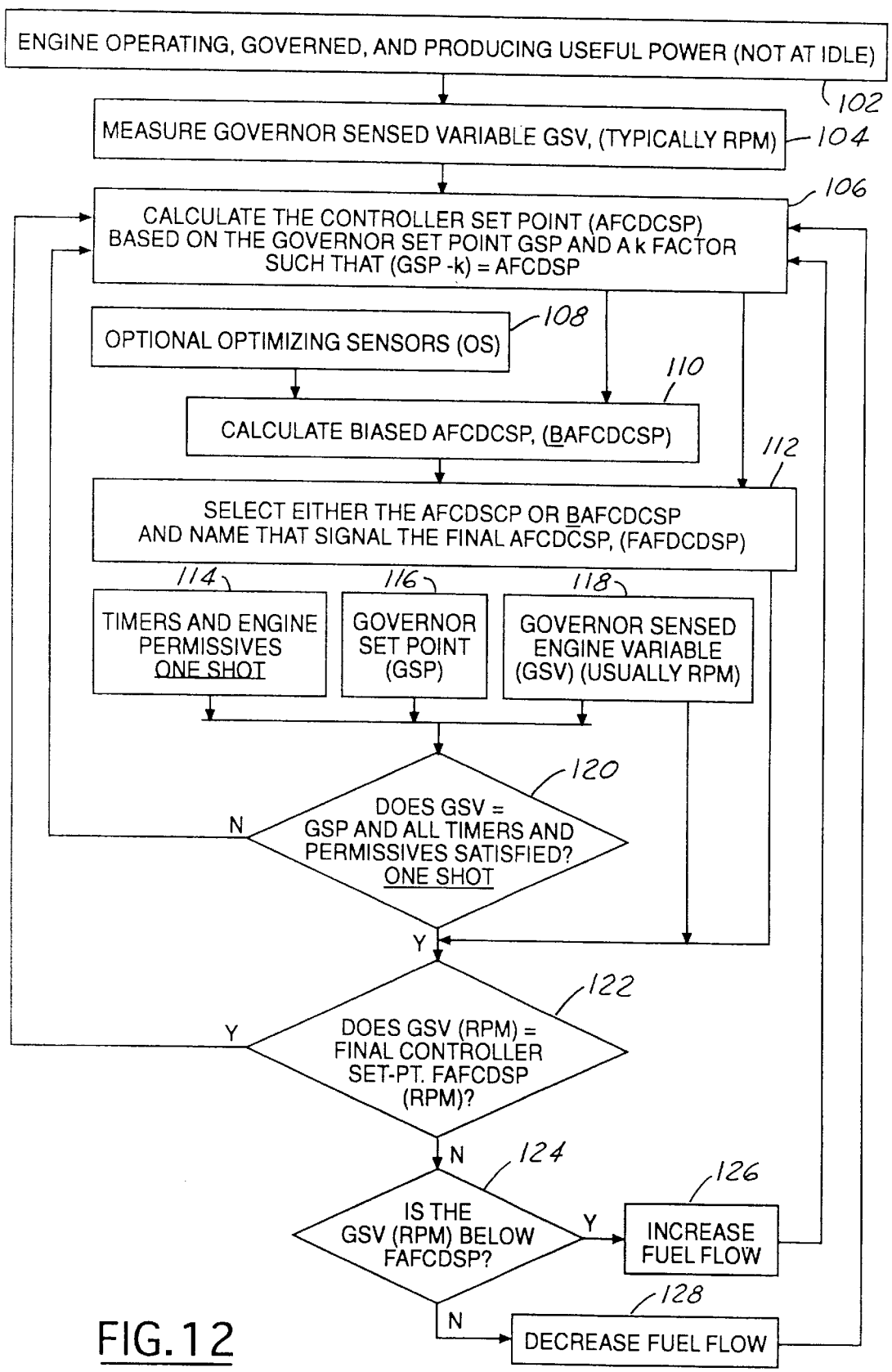
FIG. 12 is a simplified flow chart diagram depicting the control established by the embodiment of FIG. 11; and, FIG. 13 is a simplified block diagram view of a still further embodiment according to the invention featuring steering logic.

FIG. 12 shows a simplified flow chart diagram illustrating the control established by control system 10'. The method illustrated shows a control for an engine 12 such that an air-fuel ratio provided to the engine is lean of stoichiometric, and, preferably, substantially at the lean power loss/misfire limit, the same as control system 10.

In step 102, engine 12 is operating, is governed, and is producing useful power (i.e., the engine is not at idle). In particular, "governed" here means governor 24 is maintaining the GSV parameter substantially equal to the GSP parameter.

In step 104, computing device 28 receives as an input a governor sensed variable (GSV) from determining means 30, which preferably is engine speed (RPM). This step performs the function of obtaining information pertaining to an actual engine operating parameter.

In step 106, computing device 28 determines a parameter pertaining to a desired or target engine operating parameter. The units will correspond to whatever parameter is sensed in step 104. Preferably, in step 106, device 28 calculates an air-fuel computing device controller set point (AFCDCSP) based on a governor set point (GSP) parameter and a k factor such that:

AFCDCSP=(GSP−k)

The AFCDCSP is also preferably in units of speed (RPM).

The value of k is determined using either (i) data determined empirically for engine 12, or (ii) from combustion models, thermodynamics and scientific methodology, or a combination of the two. Step 106 is at the core of the operation of this alternate embodiment of the invention, control system 10'. Step 106 determines the correct control point to operate engine 12 such that operation occurs substantially at the lean power loss/misfire limit engine 12's most fuel efficient point, as well as the point producing the minimum amount of $NO_x$ and $CO_2$. The set point of governor 24 (GSP) can be, but need not be, determined by the computing device 28. As would be understood by one of ordinary skill in the art, governor 24 may be a stand-alone device, or, may be embedded in the programmed logic of computing device 28. For this reason and for clarity, the entire governor control scheme per se, is not shown in Figures. It should be understood that air-fuel computing device 28 (AFCD) may include, and preferably includes, a PID controller or equivalent controller, shown in FIG. 11 as PID controller 58'.

Steps 108 and 110 are performed in an alternate biasing embodiment of control system 10'. In step 108, a number of engine operating parameters (OP) are sensed, and, in step 110, utilized by computing device 28 to modify the air-fuel computing device controller set point (AFCDCSP). The methodologies and implementations described above in connection with biasing apply equally to control system 10'. As with system 10, the biasing parameter sensors for system 10' may include an ambient temperature sensor, an air manifold pressure sensor, an exhaust gas temperature sensor, an exhaust gas pressure sensor, an engine torque sensor, an exhaust gas oxygen sensor, an exhaust gas $NO_x$ sensor, a relative humidity sensor, a barometric pressure sensor, a cylinder firing pressure sensor, and an ignition angle sensor. These sensors generate a plurality of sensed parameter indicative signals $S_7$–$S_n$, which are provided to computing device 28 in order to bias the target engine speed AFCDCSP to yield a modified or biased set point, designated the BAFCDCSP parameter.

In step 112, computing device 28 determines whether to utilize either the BAFCDCSP (biased) set point parameter or the AFCDCSP (base line) set point parameter, and thereafter generates a final AFCDCSP designated (FAFCDCSP) parameter. This is also shown diagrammatically in FIG. 11, where the final controller set point (RPM) is provided to PID controller 58.

Steps 114, 116, 118, and 120 are performed in a further alternative embodiment of control system 10'. These steps are adapted to provide computing device 28 with information pertaining to the engine 12's ability and readiness to submit to the control established by system 10'. These steps (114, 116, 118 and 120) can be utilized and are utilized in this alternate embodiment by computing device 28 to halt further control actions according to the invention, or to alter the rate thereof. In particular, steps 114, 116, 118 and 120 may be profitably employed in situations where disturbances to a steady state operation of the engine may be expected, for example, where large power demand changes have been made on the engine, during start, warm-up, load pick up, load shed, cool down, and stop. It should be appreciated that steps 114, 116, 118 and 120 collectively provide computing device 28 with knowledge of the engine's ability and readiness to accept control established by the present invention. Note that steps 114, 116, 118 and 120 are in the nature of a one shot process. That is, steps 114, 116, 118 and 120 collectively define an optional enabling step, and once completed, need not be repeated during the remainder of the engine operation (except for the above-identified instances where steady state operation may not be attained or where steady state may be disturbed). For embodiments of control system 10' that do not utilize steps 114–120, the control action and rate may nonetheless be adjusted by proper selection of constants for PID controller 58' such that it does not cause conflict with control imposed by governor 24.

In step 122, computing device 28, and in particular PID controller 58', receives as an input the governor sensed variable GSV, which is preferably engine speed (expressed in RPM). In addition, PID controller 58' is also provided the final controller set point (expressed in RPM) designated FAFCDCSP (step 112). When the GSV parameter is equal to the final controller set point FAFCDSP (expressed in RPM), no control action is taken and the process is returned to step 106.

Otherwise, the process progresses to step 124. In step 124, if the governor sensed variable GSV (e.g., engine speed expressed in RPM) is below the desired, final controller set point FAFCDSP (also expressed in RPM), controller 58' increases fuel flow by adjusting fourth signal $S_4$ which is provided to fuel control valve 26. This increase is shown in step 126. Increasing fuel flow enriches the air fuel mixture to engine 12, which has the effect of increasing the actual engine speed, which will thereafter be picked up by PID controller 58' by way of the governor sensed variable GSV provided thereto.

While step 126 is configured to satisfy the PID controller 58' set point, governor 24 imposes its own control scheme. In particular, governor 24 senses the governor sensed variable GSV (engine speed) and compares it to the governor set point GSP signal $S_1$. Governor 24 thereafter adjusts its output to proportionally drive the air and fuel delivery apparatus 14 such that a new equilibrium point is achieved, wherein the governor set point GSP is satisfied. Here, since the engine speed has increased, the governor 24 will now take action based on the present GSP parameter, and either "open-up" or "close down" throttle valve 15.

Otherwise, control passes to step 128, wherein controller 58' adjusts signal $S_4$ so as to decrease fuel flow to engine 12. A decrease of fuel flow to engine 12 will reduce engine speed (RPM).

At equilibrium, neither the PID controller set point (FAFCDCSP expressed in RPM), nor the governor set point (GSP also expressed in RPM) are simultaneously and mutually satisfied. Instead, PID controller 58' and governor 24 (also a controller) work in opposite directions, maintaining engine 12 in a "state of tension." The parameter "k" establishes the gap between the two set points. At this time, engine 12 is in an instantaneous equilibrium state, at a lean power loss/misfire limit of engine 12 wherein fuel consumption, formation of $NO_x$, formation of $CO_2$, and heat rejected to the cooling system are minimized, and engine 12 is very nearly at its desired governor set point GSP (which may be selected by an m operator of engine 12, who may reasonably expect engine 12 to operate substantially at its set speed). The above-described equilibrium state is subject to small disturbances, so the precise equilibrium point is seldom static. Instead, the entire dynamic optimization process occurs continually in a proportional manner. This entire process is continually repeated, utilizing proportional control, to ensure continuous operation at the lean power loss/misfire limit of engine 12. Note, that the optimization of this embodiment will occur on any engine, regardless of the health of such engine, as the control point is a dynamic state, not fixed to a given power point or definitive point in the engine operating envelope (EOE).

EXAMPLE

Assume the governor set point GSP is 350 RPM, and k=1. Engine 12 in accordance with the control established by system 10' is automatically "leaned" until the engine speed is between 350 and 349 RPM (i.e., GSP–k; 350–1=349). In practice, the actual engine speed will fall somewhere between the two set points. The foregoing provides full analog control, and the tension between the two controllers (i.e., PID controller 58', and the governor 24) will achieve a dynamic stability with infinite resolution. The foregoing is not a dithering-type control. The lean power loss/lean misfire limit in this example is thus defined as delta 1 RPM. For various engine types, the value of k need not be a fixed constant, but rather, can be optimized (not just for the engine and fuel) but over the entire engine operating envelope comprising a range of engine speeds and engine torques, among other engine operating parameters. At low power settings, the k delta can be reduced because the drop off to the lean power limit/misfire limit is more abrupt and the engine will likely be more sensitive to air-fuel ratio changes. The so control established by system 10' is operable for all fuels, over the entire engine operating envelope, and requires only the governor sensed variable as a control input. Unlike control system 10, there is no need to sense torque in the embodiment of system 10'. Control system 10' requires that engine 12 be governed in some way (e.g., engine speed governed), that the default state when no control is imposed is always at least slightly lean of stoichiometric, and, that the governor 24 must have a faster response characteristic than that configured for the controller 58'. Ideally, "k" factor and the gain for the two controllers should be optimized over the entire engine operating envelope (adaptive control).

In addition, as with the first embodiment system 10, fuel control valve 26 of system 10' is selected to fail in an unrestricted or open state (i.e., "on shelf condition"). In the event that computing device 28 fails, then, the fuel control scheme is designed to fail fully open on a loss of signal. Engine 12 would therefore nonetheless still be governed (i.e., by governor 24), only the air-fuel ratio would not be optimized. Engine 12 is left operable, and the operator can be notified by an alarm of this occurrence. Alternatively, the same alarm can be used to stop the engine operation if desired. This would be useful if engine 12 must be operated at the emissions limits enabled by the control established by the present invention. This failure mode is predicated on the fact that the air and fuel delivery apparatus is selected by design to default to lean of stoichiometric A/F operation, but not so lean as to be at the lean power loss point/lean misfire limit. That is, as long as the default position is anywhere on the lean side of stoichiometric A/F, it will work suitably with the control of the invention.

System 10' does not require an active governor in all engine-operating modes. At high engine power outputs, the governor may drive the air and fuel delivery apparatus to 100% output (WOT). At that time, the power control reverts to the fuel circuit alone. This control action transition to and from governor 100% output is seamless, continuous, analog, proportional, bumpless and accomplished without two state (on/off) sensors and a "dithering" control action.

The entire process described in the foregoing paragraphs is repeated continuously in an infinitely proportional analog process to keep the engine air-fuel mixture optimized at all times. The above steps need only be reversed to return the engine to its "as found" state.

Figure 13:
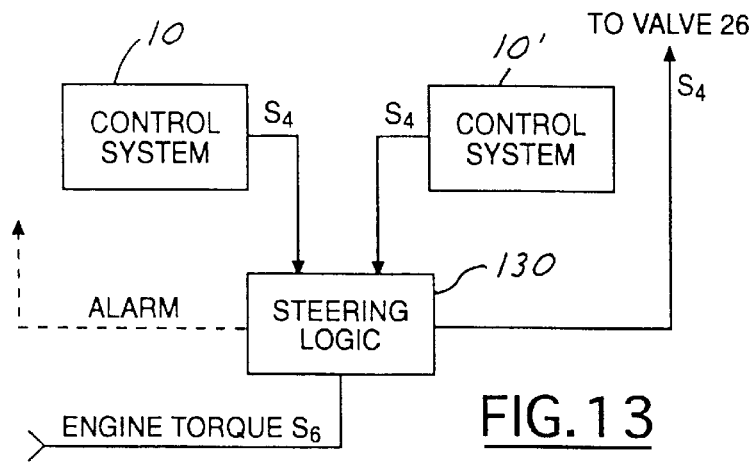

Referring now to FIG. 13, in yet another embodiment, control system 10 and control system 10' operate in accord with a unified hierarchy. In particular, a steering logic portion 130 of this embodiment is configured such that when both engine speed signal S, and engine torque signal $S_6$ are available, the steering logic selects control system 10 to control the air-fuel ratio of engine 12 in the manner set forth hereinbefore. However, steering logic 130 is further configured such that when the engine torque signal $S_6$ becomes unavailable (either invalid or absent or deselected by the operator or deselected by automatic control logic), then steering logic 130 selects control system 10' to control the air-fuel ratio provided to engine 12. In such an event, the steering logic portion may be further configured to issue an alarm to the operator. The operator then determines an appropriate response action according to predetermined response procedures, i which may be based on (i) emission compliance goals, or, (ii) fuel efficiency. It should be appreciated that when control system 10 controls the air-fuel ratio, both engine speed and engine torque are known; therefore, emissions may be determined in accord with known methods (as described hereinbefore). In this embodiment, the air-fuel ratio provided to engine 12 is always optimized with respect to fuel consumption, as well as emissions, such as $CO_2$, $NO_x$, $CO$, $CH_2O$ or other species of interest.

It is to be understood that the above description is merely exemplary rather than limiting in nature, the invention being limited only by the appended claims. Various modifications and changes may be made thereto by one of ordinary skill in the art which will embody the principles of the invention and fall within the spirit and scope thereof.

APPENDIX A

```
LLGSVT CORE SOFTWARE CODE
1000 * FUNCTION
       ARRAY          47.0000000
       ROW            RPM..PCT
       COLUMN         TORQUE.CNTRL.NOW
       OUTPUT         LEANCTRL.ARRAY.OUT
1010 * FUNCTION
       ARRAY          48.0000000
       ROW            AMT..
       OUTPUT         LEANCTRL.ARRAY.BIAS
1020 * FUNCTION
       ARRAY          49.0000000
       ROW            HORSEPWR.CNTRL.NOW
       COLUMN         LEANCTRL.RESET.CTRL
       OUTPUT         EFFICNCY..BIAS
1030 * CALCULATOR
    10 #ADATA 51[1,4] =#TIME.001-#ADATA 51[2,4]
    20 #ADATA 51[1,4]=#ADATA 51[1,4]*:A((#ADATA 51[1,4]>=0)&@
           (#ADATA 51[1,4] <60))
    30 #ADATA 51[2,4]=#TIME.001
    40 #ADATA 50[1,75] = (#ADATA 50[1,75]+#ADATA 51 [1,4]) *@
           :A(ENGINE.LOADED&(TORQUE.CNTRL.NOW>LEANCTRL.ENABLE.SP))
```

APPENDIX A-continued

```
    50 LEANCTRL.ENABLE=(#ADATA 50[1,75]]>LEANCTRL.ENABLE.DLAY)
    60
LEANCTRL.TRACK.AO=(LEANCTRL.OUTPUT.AO<0) | (LEANCTRL.OUTPUT.AO>100)
    70
LEANCTRL.RESET.AO=LEANCTRL.OUTPUT.AO*:A(~LEANCTRL.TRACK.AO)+100*@
        :A(LEANCTRL.OUTPUT.AO>100)
    80 LEANCTRL.SP=LEANCTRL.ARRAY.OUT*LEANCTRL.ARRAY.BIAS
    90
LEANCTRL.SP.CTRL=(LEANCTRL.SP.CTRL+(LEANCTRL.SP-LEANCTRL.SP.CTRL)/@
        LEANCTRL.SP.LAG)*:A(LEANCTRL.SP!=0)
   100 LEANCTRL.TRACK.CTRL=LEANCTRL.TRACK.AO|~LEANCTRL.ENABLE
   110 LEANCTRL.RESET.CTRL=LEANCTRL.RESET.AO*:A(RPM>10)
   120 LEANCTRL.ALERT=LEANCTRL.ENABLE&(:ABS(LEANCTRL.ERROR) >@
        (LEANCTRL.ERROR.HASP-LEANCTRL.ERROR.DB*:A(LEANCTRL.ALERT)))
   130 LEANCTRL.ALARM=LEANCTRL.ENABLE&(:ABS(LEANCTRL.ERROR) >@
        (LEANCTRL.ERROR.HHSP-LEANCTRL.ERROR.DB*:A(LEANCTRL.ALRM)))
   140 #ADATA 20[1,24] =LEANCTRL.OUTPUT.AO
1040 * PID3TERM
     INPUT         GOV.OUTPUT.
     SET POINT     LEANCTRL.SP.CTRL
     PROPORTION    LEANCTRL.GAIN.
     INTEGRAL      LEANCTRL.INTGRL.
     RESET         LEANCTRL.RESET.CTRL
     TRACK         LEANCTRL.TRACK.CTRL
     OUTPUT        LEANCTRL.OUTPUT.AO
     ERROR         LEANCTRL.ERROR.
#A 200
* INPUT RPM..PCT
* TORQUE.CNTRL.NOW
1      0.0  70.0   85.0   90.0   95.0  100.0  104.0
2     75.0  30.0   66.0   75.0   80.0   82.0   89.0
3    100.0  30.0   70.0   80.0   93.0  100.0  100.0
* OUTPUT LEANCTRL.ARRAY.OUT
#A 201
* INPUT AMT
1    -20    0.8
2      0    0.85
3     30    0.94
4     60    1.0
5     70    1.0
6     80    1.0
* OUTPUT LEANCTRL.ARRAY.BIAS
#A 202
* INPUT LEANCTRL.OUTPUT.AO
1      0  0.0    10.0   20.0   30.0   40.0  50.0  60.0  70.0
2    810  1.0    1.0    1.0    1.0    1.0   1.0   1.0   1.0
3   1380  1.0    1.0    1.0    1.0    1.0   1.0   1.0   1.0
*OUTPUT EFFICNCY..BIAS
```

We claim:

1. A speed-governed power generation system comprising:
    a gaseous fueled stationary internal combustion engine having an air and fuel delivery apparatus in communication with a plurality of combustion chambers of said engine;
    a governor configured to adjust said air and fuel delivery apparatus in response to a first signal corresponding to a desired engine speed and a second signal indicative of an actual engine speed, said governor being further configured to output a third signal indicative of a governor output position;
    a control valve intermediate a supply of fuel and said air and fuel delivery apparatus;
    a computing device configured to generate an output signal for adjusting said control valve in response to said second signal indicative of engine speed alone;
    wherein said control valve is responsive to said computing device output signal for adjustment of a fuel flow therethrough so as to obtain a ratio of air to fuel provided to the engine that is substantially at a lean misfire limit of the engine.

2. The system of claim 1 wherein said computing device includes means for generating a set point parameter as a function of (i) said first signal corresponding to said desired engine operating parameter; and (ii) a predetermined gap parameter (k).

3. The system of claim 2 wherein said gap parameter is selected so that the engine is operated substantially at the lean misfire limit.

4. The system of claim 2 wherein said generating means includes a proportional-integral-derivative (PID) controller.

5. The system of claim 2 wherein said computing device is further configured to adjust said output signal so as to increase fuel flow when said second signal is below said set point parameter.

6. The system of claim 2 wherein said computing device is further configured to adjust said output signal so as to decrease fuel flow when said second signal is above said set point parameter.

7. The system of claim 1 wherein said computing device includes a controller configured to generate a set point parameter as a function of (i) said first signal corresponding to said desired engine operating parameter; and (ii) a predetermined gap parameter (k).

8. A control system for a gaseous fueled stationary internal combustion engine having an air and fuel delivery apparatus in communication with combustion chambers of the engine, said control system comprising:

a governor configured to adjust the air and fuel delivery apparatus in response to a first signal corresponding to a desired engine operating parameter and a second signal indicative of an actual engine operating parameter, said governor being further configured to output a third signal indicative of a governor output position which corresponds to an opening position of the air and fuel delivery apparatus;

a control valve intermediate a supply of fuel and the air and fuel delivery apparatus;

a computing device having a first controller configured to generate a fourth signal for adjusting said valve in response to (i) said third signal; (ii) a lean combustion control map; (iii) said second signal; and, (iv) a fifth signal indicative of engine torque;

wherein said control valve is responsive to said fourth signal for adjustment of a fuel flow therethrough so as to obtain a ratio of air to fuel provided to the engine that is lean of a stoichiometric air to fuel ratio of the engine.

9. The system of claim 8 wherein said desired engine operating parameter corresponds to one selected from the group consisting of a predetermined engine speed, a predetermined engine ignition events per unit time, and a predetermined air and fuel delivery apparatus air vane force.

10. The system of claim 8 wherein said actual engine operating parameter corresponds to one selected from the group consisting of a sensed engine speed, a sensed engine ignition events per unit time, and a sensed air and fuel delivery apparatus air vane force.

11. The system of claim 8 wherein said control valve comprises a proportional control valve.

12. The system of claim 8 wherein the air and fuel delivery apparatus comprises a carburetor having a throttle valve associated therewith, and wherein said third signal comprises a governor output (GO %) parameter indicative of the relative opening of the throttle valve.

13. The system of claim 12 wherein a governor output (GO %) parameter of 100% corresponds to a wide open throttle (WOT) position of said throttle valve.

14. The system of claim 12 wherein said lean combustion control map comprises a plurality of prime governor output set-point (PGOSP) parameters, and wherein said computing device includes means for selecting one of said plurality of PGOSPs as a function of engine speed and engine torque.

15. The system of claim 14 wherein said computing device includes means for determining a final governor output set-point (FGOSP) parameter in response to said prime governor output set-point (PGOSP) parameter.

16. The system of claim 15 wherein said computing device further includes means for generating said fourth signal so as to decrease fuel flow through said control valve when said governor output (GO %) parameter is less than said final governor output set-point (FGOSP) parameter.

17. The system of claim 15 wherein said computing device further includes means for generating said fourth signal so as to increase fuel flow through said control valve when said governor output (GO %) parameter exceeds said final governor output set-point (FGOSP) parameter.

18. The system of claim 15 wherein said FGOSP parameter determining means includes means for biasing said PGOSP parameter as a function of at least one parameter selected from the group consisting of air manifold temperature (AMT), air manifold pressure (AMP), relative humidity (R/H), barometric pressure, exhaust manifold pressure (EMP), air-to-fuel (A/F) ratio, ignition timing, percent oxygen in exhaust, an amount of nitric oxides in exhaust, exhaust gas temperature (EGT), engine speed deviation, cylinder combustion pressure, and an energy content of the fuel.

19. The system of claim 15 wherein said first controller comprises a proportional-integral-derivative (PID) controller for generating said fourth signal.

20. The system of claim 14 wherein said PGOSP parameters are configured such that said control valve adjusts fuel flow therethrough according to said fourth signal so as to obtain a ratio of air to fuel provided to the engine that is substantially at a lean misfire limit of the engine.

21. The control system of claim 8 wherein said computing device further comprises a second controller responsive to said second signal configured to generate an output thereof for adjusting said valve, said control system further comprising a steering logic circuit intermediate said first controller and said valve configured to pass said fourth signal generated by said computing device to said valve as said fourth signal when in a first state, said steering logic circuit being further configured in a second state to pass said second controller output to said valve as said fourth signal, said second state being defined when said fifth signal indicative of engine torque is one of an invalid state, an absent state, deselected by an operator, and deselected by automatic logic.

22. The system of claim 21 wherein said second controller includes means for generating a second controller set point parameter (AFCDCSP) as a function of (i) said first signal corresponding to said desired engine operating parameter; and (ii) a predetermined gap parameter (k).

23. A method of operating a speed-governed internal combustion gaseous fueled engine comprising the steps of:

(A) determining an engine speed parameter and an engine torque parameter;

(B) selecting a prime governor output set-point (PGOSP) parameter from a lean combustion control map using the engine speed and engine torque parameters;

(C) determining a final governor output set-point (FGOSP) parameter using the PGOSP parameter;

(D) sensing a governor output (GO %) parameter indicative of an opening position of an air and fuel delivery apparatus for the engine; and, (E) decreasing fuel to the engine using a control valve intermediate a fuel supply and the air and fuel delivery apparatus when the FGOSP parameter is less than the GO % parameter to thereby cause the governor to increase the opening position of the air and fuel delivery apparatus to maintain engine speed.

24. The method of claim 23 further including the step of: increasing fuel to the engine using the control valve when the GO % parameter exceeds the FGOSP parameter.

25. The method of claim 23 further including the step of: defining values for the PGOSP parameters from the lean combustion control map such that the control valve adjusts fuel flow therethrough so as to obtain a ratio of air to fuel provided to the engine that is substantially at a lean misfire limit of the engine.

26. The method of claim 23 wherein the step of determining a FGOSP parameter includes the substep of: biasing the PGOSP parameter using at least one biasing parameter selected from the group consisting of air manifold temperature (AMT), air manifold pressure (AMP), relative humidity (R/H), barometric pressure, exhaust manifold pressure (EMP), air-to-fuel (A/F)

ratio, ignition timing, percent oxygen in exhaust, an amount of nitric oxides in exhaust, exhaust gas temperature (EGT), engine speed deviation, cylinder combustion pressure, and an energy content of the fuel.

27. The method of claim 23 wherein the step of decreasing fuel includes the substep of:

generating a control signal to adjust the control valve using a proportional-integral-derivative (PID) controller having the FGOSP parameter and the GO % parameter as inputs.

* * * * *